United States Patent [19]
Wright

[11] 3,995,448
[45] Dec. 7, 1976

[54] TORSIONALLY RESILIENT SHAFT COUPLING

[75] Inventor: John Wright, Baltimore, Md.

[73] Assignee: Koppers Company, Inc., Pittsburgh, Pa.

[22] Filed: Aug. 12, 1975

[21] Appl. No.: 604,018

[52] U.S. Cl. .................................. 64/11 R; 64/14; 64/27 NM
[51] Int. Cl.² .......................................... F16D 3/17
[58] Field of Search ............... 64/11 R, 27 NM, 14, 64/13, 9 R, 6, 1 V, 15 B, 27 B

[56] References Cited
UNITED STATES PATENTS

| | | | |
|---|---|---|---|
| 2,316,509 | 4/1943 | Fawick | 64/11 R |
| 3,039,281 | 6/1962 | Hartz | 64/27 NM |
| 3,054,276 | 9/1962 | Kleinschmidt | 64/11 R |
| 3,575,014 | 4/1971 | Wright | 64/14 |
| 3,834,181 | 9/1974 | Strasburg et al. | 64/11 R |

*Primary Examiner*—Samuel Scott
*Assistant Examiner*—Randall Heald
*Attorney, Agent, or Firm*—Sherman H. Barber; Oscar B. Brumback

[57] ABSTRACT

Herein disclosed is a torsionally resilient shaft coupling for serially transmitting torque and to provide a substantial amount of torsional flexibility between a pair of axially spaced coaxially aligned shafts. The torsionally resilient shaft coupling comprises a first inner sleeve and a second inner sleeve coaxially aligned with and axially spaced from the first inner sleeve. A first outer sleeve is connected to a first of the shafts and surrounds the first inner sleeve forming a first annular space therebetween. A second outer sleeve is connected to a second of the shafts and surrounds the second inner sleeve forming a second annular space therebetween. At least one first annular torsionally resilient member is interposed in the first annular space and is connected to the first inner sleeve and to the first outer sleeve to provide primary torsional flexibility between the first outer sleeve and the first inner sleeve. At least one second annular torsionally resilient member is interposed in the second annular space and is connected to the first inner sleeve and to the second outer sleeve to provide secondary torsional flexibility between the second outer sleeve and the second inner sleeve. A first rigid annular torque plate is located axially between the first and second inner sleeves and connects the first inner sleeve to the second outer sleeve for transmitting torque from the first shaft to the second outer sleeve. A second rigid annular torque plate is located axially between the second inner sleeve and the second shaft and connects the second inner sleeve to the second shaft for transmitting torque from the second inner sleeve to the second shaft.

17 Claims, 3 Drawing Figures

TORSIONALLY RESILIENT SHAFT COUPLING

BACKGROUND OF THE INVENTION

1. Field of the Invention

This invention generally relates to flexible shaft couplings having a yielding element, and more particularly to a torsionally resilient shaft coupling for serially transmitting torque and to provide a substantial amount of torsional flexibility between a pair of axially spaced and coaxially aligned shafts.

2. Description of the Prior Art

Torsionally resilient shaft couplings are typically used in industry to provide torsional flexibility between a driving member and a driven member. Typically, torsionally resilient shaft couplings are used in main drive systems connecting motors to rolls, used in metal rolling mills for reducing the thickness of metal plates. In such rolling mill drive systems, high impact shock loads excite vibration frequencies when a metal plate enters between the rolls to be reduced in thickness. Without some sort of torsional flexibility within the drive system, the tremendous shock loads encountered and the great amount of torque needed to keep the rolls turning as it reduces the thickness of the metal strip would damage the drive system. Thus, it is common that shaft couplings are used to provide most of the needed torsional flexibility.

In a typical steel rolling mill the large main rolling mill drive usually comprises an electrical motor coupled to a spacer coupling which is coupled to a pinion stand and a pair of spindle couplings connect the pinion stand to the rolls. In some applications, a conventional Holset type coupling, such as shown in Croset U.S. Pat. No. 2,873,590, may be used in the drive system to give the necessary torsional flexibility to sufficiently reduce the vibrational response of the system so that damage to the drive system is lessened. However, where very high torque applications are encountered such as in the large drive systems of main steel rolling mills, a Holset type coupling large enough to transmit the torque and yet provide the necessary torsional flexibility to adequately reduce the vibration would be excessively large, unwieldly and expensive.

In the main drive system, the spacer coupling is the logical place to provide for torsional flexibility. Generally, the spacer coupling comprises a pair of conventional misalignment gear type coupling halves which are coupled together by a spacer which may extend between 10 and 30 feet in length and may also extend through a dividing wall which separates the electrical motor and the pinion stand. It would be convenient to replace the spacer between the two coupling halves with a torsionally resilient shaft coupling that will transmit a great amount of torque while at the same time have a high degree of torsional flexibility to reduce the vibration that would otherwise be encountered.

Several torsionally flexible shaft couplings are shown in Hartz et al. U.S. Pat. No. 2,910,843, Crankshaw U.S. Pat. No. 3,080,732, and Strasburg et al. U.S. Pat. No. 3,834,181. Each of the above torsionally flexible shaft couplings are designed to transmit a high amount of torque while at the same time providing some degree of torsional flexibility. In each of the three above prior art patents, the torsionally flexible shaft coupling includes an inner sleeve connected at one end to a driven apparatus, an outer sleeve surrounding the inner sleeve providing a space therebetween, and connected to a driving apparatus. A plurality of torsionally flexible members are then interposed between the outer and inner sleeve. Each one of the torsional members include a pair of axially separated plates of which one plate is splined to the outer sleeve and the other plate is splined to the inner sleeve. Interposed between the two plates and bonded thereto is a flexible yielding element. Thus, torque is transmitted from the driving member through the outer sleeve through the flexible member to the inner sleeve and then out to the driven apparatus.

Although the above three couplings transmit a great amount of torque they do have limited usefulness where, in addition to a great amount of torque, a high degree of torsional flexibility, that is a low torsional stiffness, is desired. The more individual flexible elements that are place in parallel between the outer sleeve and the inner sleeve will cause an increase in the amount of torque that will be transmitted but the torsional stiffness of the coupling also increases thus decreasing the torsional flexibility. Thus, as shown in the Strasburg et al patent, Hartz et al patent, and Crankshaw patent only a limited number of individual flexible elements can be used in parallel if a low torsional flexibility is of prime importance.

By placing a number of these flexible units in parallel as shown in Crankshaw, Hartz et al., and Strasburg et al. the amount of torque to be transmitted is increased, however, the torsional stiffness is also increased. Thus, where a higher degree of torsional flexibility is desired in addition to a high amount of torque transmission, the above three prior art patents would be inadequate because they are incapable of performing both functions.

SUMMARY OF THE INVENTION

Accordingly, an object of the present invention is to provide a torsionally resilient shaft coupling that will overcome the aforementioned disadvantages and others. Thus, this invention provides a torsionally flexible shaft coupling that will be able to transmit a high amount of torque while at the same time providing a high degree of torsional flexibility. In addition, the torsionally resilient shaft coupling is relatively compact and inexpensive.

The apparatus for accomplishing the above objects is a torsionally resilient shaft coupling for serially transmitting torque and to provide a substantial amount of torsional flexibility between a pair of axially spaced coaxially aligned shafts through the coupling comprising: a first inner sleeve means; a second inner sleeve means coaxially aligned with and axially spaced from the first inner sleeve means; a first outer sleeve means connected to a first of the shafts, surrounding the first inner sleeve means and forming a first annular space therebetween; a second outer sleeve means connected to a second of the shafts, surrounding the second inner sleeve means and forming a second annular space therebetween; at least one first annular torsionally resilient means in the first annular space connected to the first inner sleeve means and to the first outer sleeve means to provide primary torsional flexibility between the first outer sleeve means and the first inner sleeve means; at least one second annular torsionally resilient means in the second annular space connected to the second inner sleeve means and to the second outer sleeve means to provide secondary torsional flexibility between the second outer sleeve means and the second inner sleeve means; a first rigid annular torque plate located axially between the first and second inner sleeve means connecting the first inner sleeve means to the second outer sleeve means for transmitting torque from the first shaft to the second outer sleeve means; and a second rigid annular torque plate located axially between the second inner sleeve means and the second shaft connecting the second inner sleeve means to the second shaft for transmitting torque from the second inner sleeve means to the second shaft.

Preferably, the first outer sleeve means is connected to a flexible half coupling such as gear type coupling or a diaphragm type coupling and the second rigid torque plate is connected between the second inner sleeve means and another gear type coupling half or diaphragm type coupling half to accommodate axial and angular misalignment between the electrical motor and the pinion stand of the rolling mill drive system.

The above and further objects and novel features of the invention will appear more fully in the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings, wherein like parts are marked alike.

DESCRIPTION OF THE PREFERRED EMBODIMENT

Figure 1:
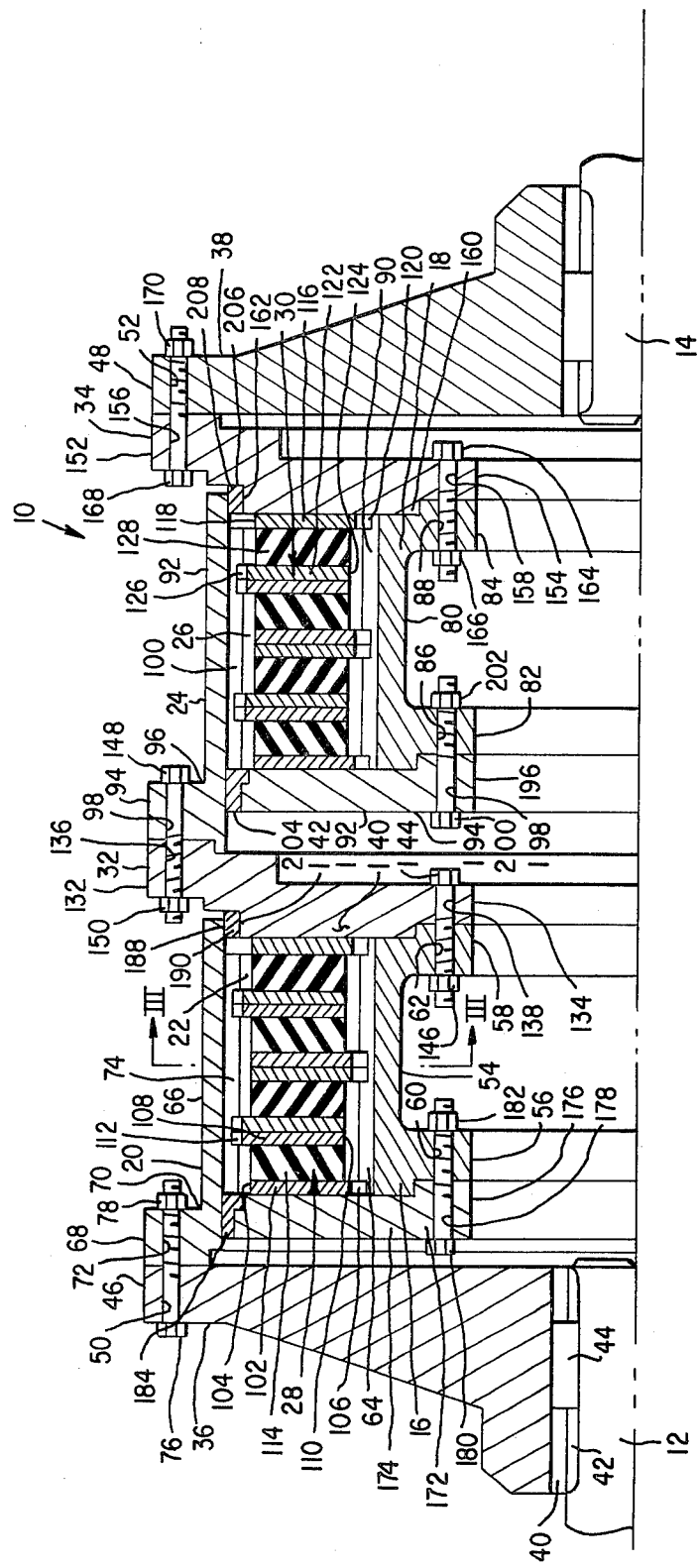
FIG. 1 is a side view in cross section of the torsionally resilient shaft coupling of the present invention showing the coupling connected between a pair of hubs.

Referring to FIG. 1, the invention generally comprises a torsionally resilient shaft coupling, denoted generally by numeral 10, for serially transmitting torque and to provide a substantial amount of torsional flexibility between a pair of axially spaced coaxially aligned shafts 12 and 14. Torsionally resilient shaft coupling 10 generally comprises a first inner sleeve means 16 and a second inner sleeve means 18 coaxially aligned with and axially spaced from first inner sleeve means 16. A first outer sleeve means 20 is connected to first shaft 12 and surrounds first inner sleeve means 16 forming a first annular space 22 therebetween. A second outer sleeve means 24 is connected to second shaft 14 and surrounds second inner sleeve means 18 forming a second annular space 26 therebetween. At least one first annular torsionally resilient means, denoted generally by numeral 28, is placed within first annular space 22 and is connected to first inner sleeve means 16 and to first outer sleeve means 20 to provide primary torsional flexibility between first outer sleeve means 20 and first inner sleeve means 16. At least one second annular torsionally resilient means, denoted generally by numeral 30, is placed within second annular space 26 and is connected to second inner sleeve means 18 and to second outer sleeve means 24 to provide secondary torsional flexibility between second outer sleeve means 24 and second inner sleeve means 18. A first rigid annular torque plate 32 is located axially between first and second inner sleeve means 16 and 18 and is connected to first inner sleeve means 16 and to second outer sleeve means 24 for transmitting torque from first shaft 12 to second outer sleeve means 24. A second rigid annular torque plate 34 is located axially between second inner sleeve means 18 and second shaft 12 and is connected to second inner sleeve means 18 and to second shaft 14 for transmitting torque from second inner sleeve means 18 to second shaft 14.

Figure 3:
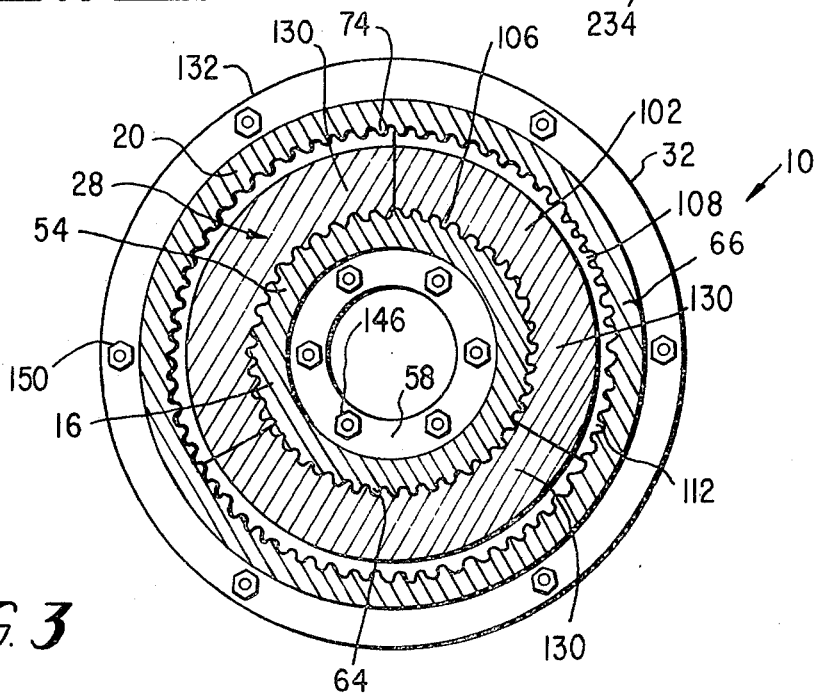
FIG. 3 is an end view in cross section of the torsionally resilient shaft coupling of FIG. 1 taken along the lines III—III and showing the torsionally resilient means connected between the inner sleeve means and the outer sleeve means.

More specifically, and referring to FIGS. 1 and 3, torsionally flexible shaft coupling 10 is used to connect a pair of axially spaced and substantially coaxially aligned shafts 12 and 14. Preferably, shaft 12 is connected to any driving apparatus (not shown) and shaft 14 is connected to any apparatus that is to be driven (not shown). For illustration purposes only, shaft 12 will be considered the driving shaft and shaft 14 will be considered the driven shaft, however, it should be understood, that either shaft 12 or 14 may be the driving or driven shaft. Torsionally resilient shaft coupling 10 transmits the torque from shaft 12 to shaft 14 while at the same time providing torsional flexibility for reducing system vibration to prevent damage to the various components in the drive system and to the driving and driven apparatuses.

Preferably, torsionally resilient shaft coupling 10 is connected to shafts 12 and 14 through a pair of hub means 36 and 38. Hub means 36 is rigidly secured to driving shaft 12 for rotation therewith such as by keying. Hub means 36 includes an axially extending groove 40 which is in radial alignment with an axially extending groove 42 in shaft 12. A conventional shaft key 44 is inserted within axially extending grooves 40 and 42 thus rigidly securing hub 36 to shaft 12. Hub means 38 is secured to shaft 14 in the same manner as hub means 36 is secured to shaft 12. Hub means 36 and 38 each include an outwardly extending flange portion 46 and 48 respectively circumferentially extending around the outer surface thereof. A plurality of circumferentially spaced and axially extending openings 50 and 52 extend through flanges 46 and 48 respectively in hubs 36 and 38.

Referring again to FIGS. 1 and 3, first inner sleeve means 16 includes a rigid annular sleeve 54 which has an outer radius substantially less than the outer radius of hub means 36. First inner sleeve means 16 further includes a pair of axially spaced and inwardly extending flanges 56 and 58 is formed on the ends of sleeve 54. Each flange 56 and 58 include a plurality of circumferentially spaced and axially extending openings 60 and 62 respectively therethrough. First inner sleeve means 16 additionally includes a plurality of outwardly extending spline teeth 64 on the outer surface thereof.

First outer sleeve means 20 includes a sleeve 66 surrounding sleeve 54 of first inner sleeve means 16. The inner radius of sleeve 66 is substantially greater than the outer radius of sleeve 54 of inner sleeve means 16 thereby forming a first space 22 between the outer surface of sleeve 54 and the inner surface of sleeve 66. First outer sleeve means 20 further includes an outwardly extending flange 68 formed at one end 70 of sleeve 66 and is adjacent hub means 36. Outwardly extending flange 68 has substantially the same radius as the radius of flange 46 of hub means 36. Flange 68 includes a plurality of circumferentially spaced and axially extending openings 72 in substantial axial alignment with openings 50 in flange 46 of hub means 36. First outer sleeve means 20 further includes a plurality of inwardly extending spline teeth 74 on the inner surface of sleeve 66. Flange 68 of first outer sleeve means 20 is rigidly secured to flange 46 of hub means 36 by bolts 76 and nuts 78.

Second inner sleeve means 18 is axially spaced from first inner sleeve means 16 and is substantially coaxially aligned therewith. Second inner sleeve means 18 includes a sleeve 80 having an outer radius substantially the same as the outer radius of sleeve 54 of first inner sleeve means 16. Second inner sleeve means 18 further includes a pair of axially spaced and inwardly extending flanges 82 and 84 formed on the ends of sleeve 80. Flanges 82 and 84 include a plurality of circumferentially spaced and axially extending openings 86 and 88 respectively. Second inner sleeve means 18 further includes a plurality of outwardly extending spline teeth 90 on the outer surface of sleeve 80.

Second outer sleeve means 24 is axially spaced from first outer sleeve means 20 and surrounds second inner sleeve means 18. Second outer sleeve means 24 includes a sleeve 92 surrounding sleeve 80 of second inner sleeve means 18. The inner radius of sleeve 92 is substantially greater than the inner radius of sleeve 80 thereby forming second space 26 between sleeve 92 and sleeve 80. Second outer sleeve means 24 further includes an outwardly extending flange 94 on one end 96 of sleeve 92 and is adjacent sleeve 66 of first outer sleeve means 20. Flange 94 includes a plurality of circumferentially spaced and axially extending openings 98 therethrough. Second outer sleeve means 24 further includes a plurality of inwardly extending spline teeth 100 formed on the inner surface of sleeve 92.

At least one first annular torsionally resilient means 28 is positioned within first space 22 between sleeve 54 of first inner sleeve means 16 and sleeve 66 of first outer sleeve means 20. Each first annular torsionally resilient means 28 includes a first rigid disc 102 having an outer end 104 radially spaced inwardly from spline teeth 74 of sleeve 66. First rigid disc 102 includes a plurality of inwardly extending gear teeth 106 which are in meshing engagement with spline teeth 64 of sleeve 54 of inner sleeve means 16. Each first annular torsionally resilient means 28 further includes a second rigid disc 108 axially spaced from first rigid disc 102. Second rigid disc 108 includes an inner end 110 which is radially spaced outwardly from spline teeth 64 of sleeve 54. Second rigid disc 108 includes a plurality of outwardly extending gear teeth 112 which are in meshing engagement with spline teeth 74 on sleeve 66 of first outer sleeve means 20. A resilient disc 114 is positioned between first and second rigid disc 102 and 108 and is secured to first and second rigid discs 102 and 108 in any known manner such as bonding. The outer radius of resilient disc 114 is substantially less than the inner radius of splined teeth 74 and the inner radius of resilient disc 114 in substantially greater than the outer radius of spline teeth 64, thus resilient disc 114 will not contact and interfere with spline teeth 64 and 74. Torque is transmitted from sleeve 66 of first outer sleeve means 20 through second rigid disc 108, resilient disc 114, first rigid disc 102, to sleeve 54 of first inner sleeve means 16.

It is preferred that resilient disc 114 be made out of any type conventional resilient material such as rubber or plastic which can be easily bonded to first and second rigid discs 102 and 108 to provide the necessary torsional resiliency to reduce drive system vibration loads.

As illustrated in FIG. 1, there are four first annular torsionally resilient means 28 positioned in parallel within space 22 between sleeves 66 and 54, and therefore each first annular torsionally resilient means 28 will transmit the torque together in parallel between sleeve 66 and sleeve 54. Although four first annular torsionally resilient means 28 are shown it should be understood that any number may be used to transmit torque and reduce drive system vibration loads. It should be pointed out, that the greater number of first annular torsionally resilient means 28 which are positioned in parallel within space 22 the greater the amount of torque that can be transmitted between sleeve 66 to sleeve 54. However, it should also be noted that when more first annular torsionally resilient means 28 are positioned in parallel within space 22 there will be an increase in the torsional stiffness of torsional resilient shaft coupling 10, that is, the greater the amount of torque being transmitted also results in a decrease in the torsional flexibility.

At least one second annular torsionally resilient means 30 is positioned within second space 26 between sleeve 80 of second inner sleeve means 18 and sleeve 92 of second outer sleeve means 24. Each second annular torsionally resilient means 30 includes a first rigid disc 116 having an outer end 118 radially spaced inwardly from gear teeth 100 on sleeve 92. First rigid disc 116 includes a plurality of inwardly extending gear teeth 120 in meshing engagement with splined teeth 90 on sleeve 80 of second inner sleeve means 18. Second annular torsionally resilient means 30 further includes a second rigid disc 122 axially spaced from first rigid disc 116. Second rigid disc 122 has an inner end 124 radially spaced outwardly from spline teeth 90 on sleeve 80. Second rigid disc 122 includes a plurality of outwardly extending gear teeth 126 which are in meshing engagement with spline teeth 100 on sleeve 92. Second annular torsionally resilient means 30 further includes a resilient disc 128 interposed between first and second rigid discs 116 and 122 and is secured thereto in any known manner such as by bonding. The outer radius of resilient disc 128 is substantially less than the inner radius of splined teeth 100 and the inner radius of resilient disc 128 is substantially greater than the outer radius of spline teeth 90, thus resilient disc 128 will not contact and interfere with spline teeth 90 and 100. Torque is transmitted from sleeve 92 of second outer sleeve means 24 through second rigid disc 122, resilient disc 128, first rigid disc 116, to sleeve 80 of second inner sleeve means 18. It is preferred that resilient disc 128 be made out of any conventional resilient material such as rubber or plastic which can be easily bonded to first and second rigid discs 116 and 122 while at the same time provide the necessary torsional resiliency to reduce drive system vibration loads.

As shown in FIG. 1, there are four second annular torsionally resilient means 30 positioned in parallel with space 26. Although four second annular torsionally resilient means 30 are shown within space 26 it should be understood that any number may be used to transmit torque and reduce drive system vibration loads. The number of second annular torsionally resilient means 30 placed in parallel within space 26 will depend upon the amount of torque to be transmitted from sleeve 92 to sleeve 80. The greater number of second annular torsionally resilient means 30 placed in parallel within space 26 the greater the amount of torque that can be transmitted, however, this will also increase the torsional stiffness of torsionally resilient shaft coupling 10, that is, there will be a decrease in torsional flexibility.

If desired resilient discs 114 and 128 may be pre-loaded in compression between first and second rigid discs 102 and 108 and 116 and 122 respectively. By pre-loading in compression, resilient discs 114 and 128 can transmit higher torques than if they are bonded in a non pre-loaded condition.

Referring now to FIG. 3, it is preferred that first and second annular torsionally resilient means 28 and 30 be formed as a plurality of substantially equally shaped segments 130. Each of the segments 130 are in abutting relationship to adjacent segments 130 to form first and second annular torsionally resilient means 28 and 30 into an annular shape. Further, it is preferred that first and second annular torsionally resilient means 28 and 30 be formed with three equally shaped segments as shown in FIG. 3. It is preferred that first and second annular torsionally resilient means 28 and 30 be formed in segments 130 to facilitate production and manufacturing thereof. Although the above is the preferred construction of first and second annular torsionally resilient means 28 and 30 it should be understood, however, that they may be made with any number of segments 130 in addition to not being segmented at all.

Referring to FIGS. 1 and 3, first rigid annular torque plate 32 is positioned between first and second inner sleeve means 16 and 18. The outer radius of first rigid annular torque plate 32 is substantially the same as the outer radius of flange 94 on second outer sleeve means 24. The inner radius of first rigid annular torque plate 32 is substantially the same as the inner radius of flange 58 on first inner sleeve means 16. First rigid annular torque plate 32 includes an outer flange 132 and an inner flange 134. First rigid annular torque plate 32 further includes a plurality of circumferentially spaced and axially extending openings 136 through outer flange 132 and a plurality of circumferentially spaced and axially extending openings 138 through flange 134. Openings 136 are in axial alignment with openings 98 in flange 94 of second outer sleeve means 24 and openings 138 are in axial alignment with openings 62 in flange 58 of first inner sleeve means 16. First rigid annular torque plate 32 further includes an offset portion 140 which axially extends into first space 22. A shoulder portion 142 on the outer surface of offset portion 140 is radially spaced inward from sleeve 66 and sleeve 66 axially overlaps shoulder portion 142. Flange 134 of first rigid annular torque plate 32 is secured to flange 58 of first inner sleeve means 16 by bolts 144 and nuts 146. In addition, flange 132 of first rigid annular torque plate 32 is rigidly secured to flange 94 of second outer sleeve means 24 by bolts 148 and nuts 150.

Second rigid annular torque plate 34 is positioned between second inner sleeve means 18 and hub means 38. The outer radius of second rigid annular torque plate 34 is substantially the same as the outer radius of flange 48 on hub means 38. The inner radius of second rigid annular torque plate 34 is substantially the same as the inner radius of flange 84 on second inner sleeve means 18. Second rigid annular torque plate 34 includes an outer flange 152 and an inner flange 154. Second rigid annular torque plate 34 further includes a plurality of circumferentially spaced and axially extending openings 156 through outer flange 152 and a plurality of circumferentially spaced and axially extending openings 158 through flange 154. Openings 156 are in axial alignment with openings 52 in flange 48 of hub means 38 and openings 158 are in axial alignment with openings 88 in flange 84 of second inner sleeve means 18. Second rigid annular torque plate 34 further includes an offset portion 160 which axially extends into second space 26. Offset portion 160 includes a shoulder portion 162 on the outer surface thereof which is radially spaced inwardly from sleeve 92 of second outer sleeve means 24 and sleeve 92 axially overlaps shoulder portion 162. Flange 154 of second rigid annular torque plate 34 is rigidly secured to flange 84 of second inner sleeve means 18 by bolts 164 and nuts 166. Flange 152 of second rigid annular torque plate 34 is rigidly secured to flange 48 of hub means 38 by bolts 168 and nuts 170.

In the aforementioned configuration the plurality of first annular torsionally resilient means 28 placed in parallel within first space 22 between first outer sleeve means 20 and first inner sleeve means 16 are connected in series with the plurality of second annular torsionally resilient means 30 placed in parallel within second space 26 between second outer sleeve means 24 and second inner sleeve means 18 by first rigid annular torque plate 32 connecting first inner sleeve means 16 to second outer sleeve means 24. Thus, torque transmitted by first annular torsionally resilient means 28 to first inner sleeve means 16 will be transmitted by second annular torsionally resilient means 30 to second inner sleeve means 18. In addition, since the plurality of first annular torsionally resilient means 28 are in series with the plurality of second annular torsionally resilient means 30, a high amount of torque can be transmitted and an increase in torsional resiliency is obtained.

Referring now to FIG. 1, torsionally resilient shaft coupling 10 further includes a first bearing means 172 adjacent shaft 12 and positioned between first inner sleeve means 16 and first outer sleeve means 20. First bearing means 172 includes an annular bearing support ring 174 having an outer radius substantially less than the inner radius of sleeve 66 of first outer sleeve means 20. Support ring 174 includes an inner flange 176 having an inner radius substantially the same as the inner radius of flange 54 of first inner sleeve means 16. Inner flange 176 includes a plurality of circumferentially spaced and axially extending openings 178 therethrough in substantial axial alignment with openings 60 in flange 56. Inner flange 176 of support ring 174 is rigidly secured to flange 56 of first inner sleeve means 16 by bolts 180 and nuts 182. First bearing means 172 further includes an annular bearing member 184 interposed between the outer surface of support ring 174 and the inner surface of sleeve 66 of first outer sleeve means 20. Bearing member 184 is secured to the outer surface of support ring 174 in any known manner such as by a press fit so that bearing member 184 will not rotate around support ring 174. Bearing member 184 is in sliding contact with the inner surface of sleeve 66 of first outer sleeve means 20 so that sleeve 66 can rotate around bearing member 184.

Torsional flexible shaft coupling 10 further includes a second bearing means 188 located axially between the first outer sleeve means 20 and first rigid annular torque plate means 32. Second bearing means 188 includes a bearing ring 190 secured to any known manner such as by a press fit to shoulder portion 142 on offset portion 140 of first rigid annular torque plate 32. Thus, bearing ring 190 cannot rotate around shoulder portion 142. The outer surface of bearing ring 190 is in sliding contact with the inner surface of sleeve 66 of first outer sleeve means 20. Thus, sleeve 66 can rotate around bearing ring 190.

Since first bearing means 170 and second bearing means 188 are in sliding contact with the inner surface of sleeve 66 and first bearing means 172 is rigidly secured to first inner sleeve means 16 and second bearing means 188 is secured to first rigid annular torque plate 32, which is also rigidly secured to first inner sleeve means 30, first inner sleeve means 16 will remain radially concentric with first outer sleeve means 20 while at the same time allowing rotational movement of first outer sleeve means 20 about bearing members 184 and 190.

Torsionally resilient shaft coupling 10 further includes a third bearing means 192 adjacent first rigid annular torque plate 32 and positioned between second inner sleeve means 18 and second outer sleeve means 24. Third bearing means 192 includes a support ring 194 having an outer radius substantially less than the inner radius of sleeve 92 of second outer sleeve means 24. Support ring 194 further includes an inner flange 196 having an inner radius substantially the same as the inner radius of flange 82 of second inner sleeve means 18. Inner flange 196 includes a plurality of circumferentially spaced and axially extending openings 198 in substantial axial alignment with openings 86 in flange 82. Flange 196 is rigidly secured to flange 82 of second inner sleeve means 18 by bolts 200 and nuts 202. Third bearing means 192 further includes a bearing member 204 rigidly secured in any known manner such as by a press fit to the outer surface of support ring 194 so that bearing member 204 does not rotate about support ring 194. Bearing member 204 is in sliding contact with the inner surface of sleeve 92 of second outer sleeve means 24 so that sleeve 92 can rotate around bearing member 204.

Torsionally resilient shaft coupling 10 further includes a fourth bearing means 206 located axially between second outer sleeve means 24 and second torque plate 34. Fourth bearing means 206 includes a bearing member 208 secured in any known manner such as by a press fit to shoulder portion 162 on offset portion 160 of second rigid annular torque plate 34 so that bearing member 208 does not rotate about shoulder portion 162. Bearing member 208 is in sliding contact with the inner surface sleeve 92 of second outer sleeve means 24 so that sleeve 92 can rotate around bearing member 208.

Since third bearing means 192 and fourth bearing means 206 are in sliding contact with the inner surface of sleeve 92 and third bearing means 192 is rigidly secured to second inner sleeve means 18 and fourth bearing means 206 is secured to second rigid annular torque plate 34, which is also rigidly secured to second inner sleeve means 18, second inner sleeve means 18 will remain radially concentric with second outer sleeve means 24 while at the same time allowing rotational movement of second outer sleeve means 24 around bearing members 204 and 208.

As shown in FIG. 1, torsionally resilient shaft coupling 10 is connected between the pair of hubs 36 and 38, which are secured to shafts 12 and 14 respectively.

Figure 2:
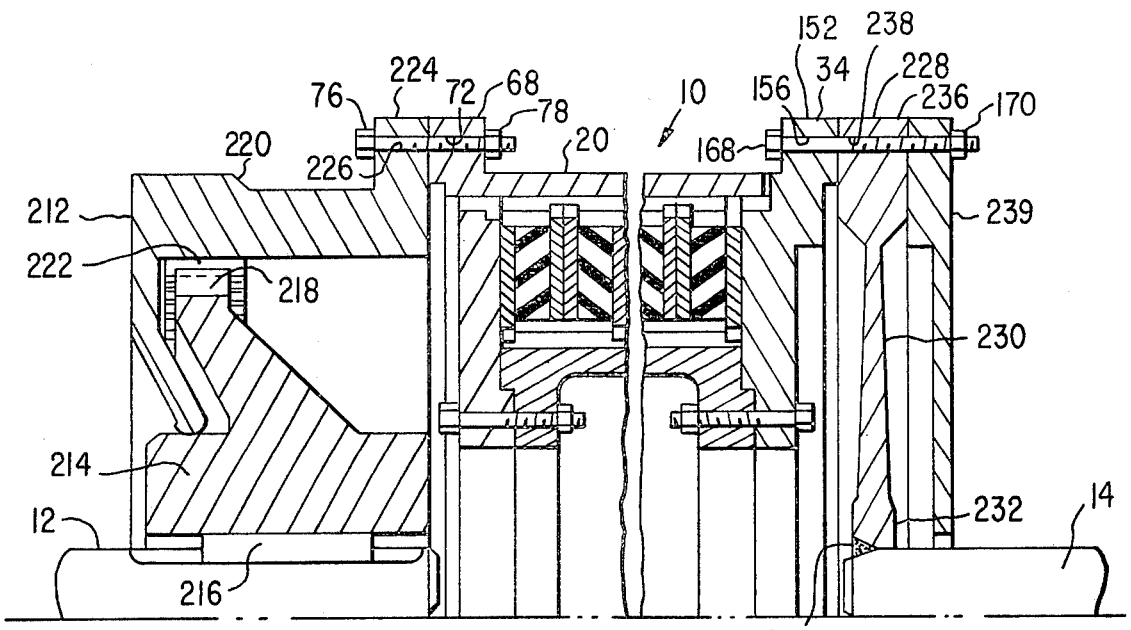
FIG. 2 is a side view in cross section of the torsionally resilient shaft coupling of the present invention connected between axially and angularly flexible shaft couplings halves.

Although this arrangement provides torsional flexibility between shafts 12 and 14, it is substantially unable to accommodate axial and angular misalignment between shafts 12 and 14. Referring now to FIG. 2, where, in addition to torsional flexibility, axial and angular misalignment must also be accommodated for, axial and angular misalignment coupling halves may be substituted for hubs 36 and 38. FIG. 2 shows two types of axial and angular misalignment shaft couplings that may be used with torsionally resilient shaft coupling 10 to give the drive system torsional flexibility and axial and angular misalignment capabilities. On the left side of FIG. 2 is a flexible shaft coupling half commonly known as a gear type coupling half 212. On the right side of FIG. 2 is a flexible shaft coupling half commonly known as a diaphragm type coupling half 228. For illustration purposes only coupling halves 212 and 228 are shown connected at each end of torsionally resilient shaft coupling 10. It should be understood that in actual operation the two different coupling halves 212 and 228 would not necessarily be used together with torsionally resilient shaft coupling 10, but the same type coupling half 212 or 228 could be used either singly or as a pair. Where only a sight amount of axial and angular misalignment is encountered between shafts 12 and 14, only one coupling half 212 or 228 need be used and is connected between shaft 12 and flange 68 of first outer sleeve means 20. The other end of torsionally resilient shaft coupling 10 may be secured as previously explained in FIG. 1 to a conventional hub 38. However, where large amounts of axial and angular misalignment or any amount of offset misalignment is encountered between the shafts 12 and 14, a pair of coupling halves 212 or 228 are secured between torsionally resilient shaft coupling 10 and shafts 12 and 14.

Referring to the left side of FIG. 2, any well-known and conventional gear type coupling half 212 such as shown in Chase et al U.S. Pat. No. 3,402,572 may be used between shaft 12 and flange 68 of first outer sleeve means 20 and therefore a detailed description of a gear type coupling half will not be further described. In general, however, gear type coupling half 212 comprises a hub means 214 which is rigidly secured to shaft 12 by key means 21 in the same manner as hub 36 was secured to shaft 12 in FIG. 1. Hub means 214 includes a plurality of outwardly extending gear teeth 218 circumferentially surrounding the outer surface thereof. A sleeve means 220 surrounds hub means 214 and includes inwardly extending gear teeth 212 surrounding the inner surface thereof and is in meshing engagement with gear teeth 218. Sleeve means 220 includes an outwardly extending flange 224 having an outer radius substantially the same as the outer radius of flange 66 of first outer sleeve means 20. Flange 224 includes a plurality of circumferentially spaced and axially extending openings 226 in axial alignment with openings 72 in flange 68. Flange 224 is secured to flange 68 by bolts 76 and nuts 78. When additional axial, angular and offset misalignment is to be accommodated a second gear type coupling half 212 is secured to shaft 14 in the same manner as gear type coupling half 212 is secured to shaft 12. Flange 224 on sleeve means 220 is secured to flange 152 of second torque plate 34 by bolts 168 and nuts 170.

Referring now to the right side of FIG. 2, any well known and conventional diaphragm type coupling half 228 such as shown in Rothfuss et al U.S. Pat. No.

3,124,942 may be used instead of gear type coupling halves 212 to accommodate axial and angular misalignment and therefore a detailed description of a diaphragm type coupling half will not be further described. As shown in FIG. 2, diaphragm type coupling half 228 is secured between second torque plate 34 and shaft 14. In general, diaphragm coupling half 228 includes a flexible annular disc 230 which has an outer radius substantially the same as the outer radius of flange 152 of second torque plate 34. The inner end 232 of flexible annular disc 230 surrounds shaft 14 and is rigidly secured thereto such as by weld 234. The outer end 236 of flexible annular disc 230 includes a plurality of circumferentially spaced and axially extending openings 238 in substantial axial alignment with openings 156 in flange 152. Outer end 236 of flexible annular disc 230 is secured to flange 152 of second torque plate 34 by bolts 168 and nuts 170. Diaphragm coupling half 228 further includes an annular shield 239 surrounding shaft 14 and secured to outer end 236 of flexible annular disc 230 by bolts 168 and nuts 170. Annular shield 239 maintains torsionally resilient shaft coupling 10 substantially concentric about shaft 14 should annular disc 230 break and also prevents metal particles from radially flying outward should annular disc 230 break. When additional axial, angular and offset misalignment is to be accommodated a second diaphragm coupling half 228 is secured to shaft 12 in the same manner as diaphragm coupling half 228 is secured to shaft 14. Outer end 236 is secured to flange 68 of first outer sleeve means 20 by bolts 76 and nuts 78.

In operation and referring to FIGS. 1 and 3, torsionally resilient shaft coupling 10 is able to transmit high amounts of torque while providing at the same time a high degree of torsional flexibility. As shown in FIG. 1, a plurality of first annular torsionally resilient means 28 are placed in parallel within space 22 between sleeve 66 of first outer sleeve means 20 and sleeve 54 of first inner sleeve means 16. By increasing the number of first annual torsionally resilient means 28 positioned in parallel within space 22, an increase in the amount of torque that can be transmitted through each first annular torsionally resilient means 28 is obtained. However, when a plurality of first annular torsionally resilient means 28 are placed in parallel a decrease in torsional flexibility between first outer sleeve means 20 and first inner sleeve means 16 results. To provide the necessary torsional flexibility necessary to substantially reduce the drive system vibration loads a plurality of second annular torsionally resilient means 30, also in parallel, are placed in series with the plurality of first annular torsionally resilient means 28. A plurality of second annular torsionally resilient means 30 are placed in parallel within space 26 between sleeve 92 of second outer sleeve means 24 and sleeve 80 of second inner sleeve means 18 to transmit the torque from first inner sleeve means 16 which is connected by first torque plate 32 to second outer sleeve means 24 through each second annular torsionally resilient means 30 to second inner sleeve means 18. Since second annular torsionally resilient means 30 are in series with first annular torsionally resilient means 28, the torque transmitted to second inner sleeve means 18 will be the same as the torque transmitted through first annular torsionally resilient means 28, however, the torsional flexibility will double, that is, the torsional stiffness will be halved. Thus, with torsionally resilient shaft coupling 10, a great amount of torque can be transmitted, depending upon the number of first annular torsionally resilient means 28 placed in parallel, and a great amount of torsional flexibility is obtained because second annular torsionally resilient means 30 are placed in series with first annular torsionally resilient means 28.

For illustration purposes only it will be assumed that shaft 12 is the driving shaft and is connected to an electrical motor (not shown) and shaft 14 is the driven shaft and is connected for example to a pinion stand (not shown) which drives a pair of rolls in a steel rolling mill for decreasing the thickness of a steel plate passing between the rolls. Thus, when the electrical motor has been energized shaft 12, hub 36 torsionally resilient shaft coupling 10, hub 38, shaft 14, the pinion stand and the rolls will rotate. When a steel plate enters the gap between the rolls, an instantaneous torque load is generated which causes torsional vibrations in the drive system. Thus, to keep the rolls rotating to decrease the thickness of the steel plate, a high amount of torque must be transmitted by the electrical motor and shaft 12 to the pinion stand. The torque necessary to keep the rolls rotating is transmitted from the electrical motors to shaft 12 through hub 36 and to sleeve 66 of first outer sleeve means 20. The torque is then transmitted through the splined teeth 74 of sleeve 66 to the splined teeth 112 of second rigid disc 108. The torque is then transmitted through resilient discs 114 to first rigid disc 102 and through its gear teeth 106 to spline teeth 64 of sleeve 54 of first inner sleeve means 16. When the torque is being transmitted to the first inner sleeve means 16 each flexible disc 114 provides primary torsional flexibility to reduce the vibration loads in the drive system. In addition, since first outer sleeve means 20 and first inner sleeve means 16 are held radially concentric about each other by first bearing means 172 and second bearing means 188 and since sleeve 66 slidably rotates around first and second bearing means 172 and 188, the proper primary flexibility can be provided by resilient discs 114 when placed in shear. The torque is then transmitted from first inner sleeve means 16 to first torque plate 32 and from first torque plate 32 to second outer sleeve means 24. The torque is then transmitted by splined teeth 100 of sleeve 92 through gear teeth 126 of second rigid discs 122. The torque is then transmitted through resilient discs 128, through first rigid discs 116, through gear teeth 120 of first rigid discs 116, and through gear teeth 90 of sleeve 80 of second inner sleeve means 18. Thus, the torque being tansmitted by the first annular torsionally resilient means 28 is transmitted to the second inner sleeve means 18 by second annular torsionally resilient means 30. However, since resilient discs 128 are interposed between second outer sleeve means 24 and second inner sleeve means 18 and because second outer sleeve means 26 is allowed to slideably rotate thereabout third and fourth bearing means 192 and 206 resilient discs 128 of second annular torsionally resilient means 30 secondarily reduces the vibration loads encountered by the drive train. The torque is then transmitted from second inner sleeve means 18, through second torque plate 34, through hub 38, to shaft 14 and to the pinion stand and rolls for turning the rolls to decrease the thickness of the steel plate passing therethrough.

Although the above operation has been described where torsional resilient shaft coupling 10 is connected to the drive train in a steel rolling mill it should be understood, that torsional resilient shaft coupling 10 can be used in other type drive trains where a high amount of torque and a high degree of torsional flexibility is needed. Thus, torsionally resilient shaft coupling 10 may be used in drive trains that are used for example in ships drives, synchronous motor drives, diesel driven dynamometer test stands and dredge pump drives, rotary kiln drives and slab shear drives.

When the torsional resilient shaft coupling is used in combination with misalignment coupling halves such as the gear type couplings or the diaphragm type couplings the operation for transmitting the torque and primarily and secondarily reducing drive system vibration loads are exactly the same as previously described when used with hubs, and therefore, will not be further described.

The foregoing has presented a novel torsionally resilient shaft coupling for connecting a driving apparatus to a driven apparatus. The problem of transmitting a high amount of torque while at the same time providing for maximum torsional flexibility to provide a high degree of reduction of drive system vibration loads has been eliminated by placing a number of first annular torsionally resilient means in series with a plurality of second annular torsionally resilient means.

Accordingly, the invention having been described in its best embodiment and mode of operation that which is desired to be claimed by Letters Patent is:

1. A torsionally resilient shaft coupling for serially transmitting torque and to provide a substantial amount of torsional flexibility between a pair of axially spaced coaxially aligned shafts through said coupling comprising:
    a first inner sleeve means;
    a second inner sleeve means coaxially aligned with and axially spaced from said first inner sleeve means;
    a first outer sleeve means connected to a first of said shafts, surrounding said first inner sleeve means and forming a first annular space therebetween;
    a second outer sleeve means connected to a second of said shafts, surrounding said second inner sleeve means and forming a second annular space therebetween;
    at least one first annular torsionally resilient means in said first annular space connected to said first inner sleeve means and to said first outer sleeve means to provide primary torsional flexibility between said first outer sleeve means and said first inner sleeve means;
    at least one second annular torsionally resilient means in said second annular space connected to said second inner sleeve means and to said second outer sleeve means to provide secondary torsional flexibility between said second outer sleeve means and said second inner sleeve means;
    a first rigid annular torque plate located axially between said first and second inner sleeve means connecting said first inner sleeve means to said second outer sleeve means for transmitting torque from said first shaft to said second outer sleeve means; and
    a second rigid annular torque plate located axially between said second inner sleeve means and second shaft connecting said second inner sleeve means to said second shaft for transmitting torque from said inner sleeve means to said second shaft.

2. The shaft coupling of claim 1 further including:
    first bearing means adjacent said first shaft and between said first inner sleeve means and said first outer sleeve means;
    second bearing means located axially between said first outer sleeve means and said first torque plate;
    for maintaining said first inner sleeve means radially concentric within said first outer sleeve means;
    third bearing means adjacent said first torque plate and between said second inner sleeve means and said second outer sleeve means; and
    fourth bearing means located axially between said second outer sleeve means and said second torque plate,
    for maintaining said second inner sleeve means radially concentric within said second outer sleeve means.

3. The shaft coupling of claim 2 wherein said first bearing means includes:
    an annular bearing support ring rigidly secured to said first inner sleeve means; and
    an annular bearing member surrounding an outer periphery of said support ring and in sliding contact with said first outer sleeve means.

4. The shaft coupling of claim 2 wherein said second bearing means includes an annular bearing member surrounding a shoulder portion of said first torque plate radially spaced from said first outer sleeve member, said annular bearing member being in sliding contact with said first outer sleeve means.

5. The shaft coupling of claim 2 wherein said third bearing means includes:
    an annular bearing support ring rigidly secured to said second inner sleeve means; and
    an annular bearing member surrounding an outer periphery of said support ring and in sliding contact with said second outer sleeve means.

6. The shaft coupling of claim 2 wherein said fourth bearing means includes an annular bearing member surrounding a shoulder portion of said second torque plate radially spaced from said second outer sleeve member, said annular bearing member being in sliding contact with said second outer sleeve means.

7. The shaft coupling of claim 1 wherein said first and second annular torsionally resilient means comprises:
    a first rigid disc;
    a second rigid disc axially spaced from said first rigid disc; and
    a resilient disc interposed between and secured to said first and second rigid discs.

8. The shaft coupling of claim 7 wherein:
    said first rigid disc of said first and second annular torsionally resilient means has a plurality of inwardly extending gear teeth in meshing engagement with a plurality of axially extending spline teeth on said first and second inner sleeve means respectively; and
    said second rigid disc of said first and second torsionally resilient means has a plurality of outwardly extending gear teeth in meshing engagement with a plurality of axially extending spline teeth on said first and second outer sleeve means respectively.

9. The shaft coupling of claim 8 wherein said first and second annular torsionally resilient means are a plurality of substantially equal arcuately shaped segments in abutting relationship to adjacent segments.

10. The shaft coupling of claim 9 wherein three of said segments form each of said first and second annular torsionally resilient means.

11. The shaft coupling of claim 1 further including:

a first hub means rigidly secured to said first shaft and said first outer sleeve means; and a second hub means rigidly secured to said second shaft and said second torque plate, for transmitting torque from said first shaft to said first outer sleeve means and from said second inner sleeve means to said second shaft.

12. The shaft coupling of claim 1 further including an axially and angularly flexible coupling half connected to said first shaft and to said first outer sleeve means for accommodating axial and angular misalignment between said first and second shafts.

13. The shaft coupling of claim 12 wherein said flexible coupling half is a gear type coupling half.

14. The shaft coupling of claim 12 wherein said flexible coupling half is a diaphragm type coupling half.

15. The shaft coupling of claim 1 further including:

a first axially and angularly flexible coupling half connected to said first shaft and to said first outer sleeve means; and a second axially and angularly flexible coupling half connected to said second shaft means and said second torque plate, for accommodating axial, angular, and offset misalignment between said first and second shafts.

16. The shaft coupling of claim 15 wherein said first and second flexible coupling halves are gear type coupling halves.

17. The shaft coupling of claim 15 wherein said first and second flexible coupling halves are diaphragm type coupling halves.

* * * * *